United States Patent [19]

Watanabe et al.

[11] Patent Number: 5,366,048

[45] Date of Patent: Nov. 22, 1994

[54] VIBRATION DAMPING DEVICE

[75] Inventors: Isao Watanabe; Makoto Nakao; Kiyoshi Ohno; Masatoshi Ohishi, all of Kodaira, Japan

[73] Assignee: Bridgestone Corporation, Tokyo, Japan

[21] Appl. No.: 226,365

[22] Filed: Apr. 12, 1994

Related U.S. Application Data

[63] Continuation of Ser. No. 29,944, Mar. 9, 1993, abandoned, which is a continuation of Ser. No. 570,659, Aug. 21, 1990, abandoned.

[30] Foreign Application Priority Data

Aug. 25, 1989 [JP] Japan .................. 1-217204
Jun. 26, 1990 [JP] Japan .................. 2-165682

[51] Int. Cl.⁵ .............................................. F16F 9/04
[52] U.S. Cl. ................................. 188/267; 188/298; 188/322.17; 188/312; 188/313; 267/64.24; 267/122; 267/140.14
[58] Field of Search ............... 188/298, 299, 312, 313, 188/314, 315, 322.16, 322.17, 322.19, 267, 322.5, 311; 267/64.11-64.28, 35, 122, 140.11, 140.14, 140.15

[56] References Cited

U.S. PATENT DOCUMENTS

| | | |
|---|---|---|
| 1,884,477 | 10/1932 | Albert . |
| 2,606,631 | 8/1952 | Grooms ........................ 188/298 |
| 2,919,883 | 1/1960 | Murphy ...................... 267/122 X |
| 3,046,003 | 7/1962 | Schultz ...................... 267/64.24 |
| 3,075,601 | 1/1963 | Müller . |
| 4,572,488 | 2/1986 | Holmberg, Jr. et al. .... 267/64.27 X |
| 4,848,495 | 7/1989 | Hayashi ..................... 188/298 X |
| 4,854,555 | 8/1989 | Ohkawa et al. ............ 267/64.27 X |
| 4,858,733 | 8/1989 | Noguchi et al. ............... 188/267 |
| 5,180,145 | 1/1993 | Watanabe et al. ............ 188/267 |

FOREIGN PATENT DOCUMENTS

| | | |
|---|---|---|
| 537348 | 4/1955 | Belgium . |
| 0298266 | 1/1989 | European Pat. Off. . |
| 0382171 | 8/1990 | European Pat. Off. . |
| 2227461 | 11/1974 | France . |
| 2576994 | 1/1986 | France . |
| 3436664 | 5/1985 | Germany . |
| 3731024 | 3/1988 | Germany . |
| 3742340 | 7/1988 | Germany . |
| 81529 | 5/1985 | Japan . |
| 255872 | 2/1927 | United Kingdom . |
| 1282568 | 7/1972 | United Kingdom . |
| 2172081 | 9/1986 | United Kingdom ........... 188/298 |
| 1196558 | 12/1985 | U.S.S.R. ......................... 188/298 |

OTHER PUBLICATIONS

Patent Abstract of Japan vol. 4, No. 161 (M-40)(643) 11 Nov. 1980, & JP-A-55 112440 (Tokyo Shibaura Denki) 30 Aug. 1980, *whole document*.

Primary Examiner—Douglas C. Butler
Attorney, Agent, or Firm—Sughrue, Mion, Zinn, Macpeak & Seas

[57] ABSTRACT

A vibration damping device comprises two cylindrical and flexible membrane members, a restricted passage constituting member connected at both end portions to these membrane members, two face plates connected at their end portion to the membrane members, a closed chamber defined by these members and face plates, a rigid member connecting both the face plates to each other at inside or outside of the closed chamber, a fluid filled in the closed chamber, and a fastening member disposed at each side of the restricted passage constituting member and the face plate.

3 Claims, 9 Drawing Sheets

FIG_1

FIG_3
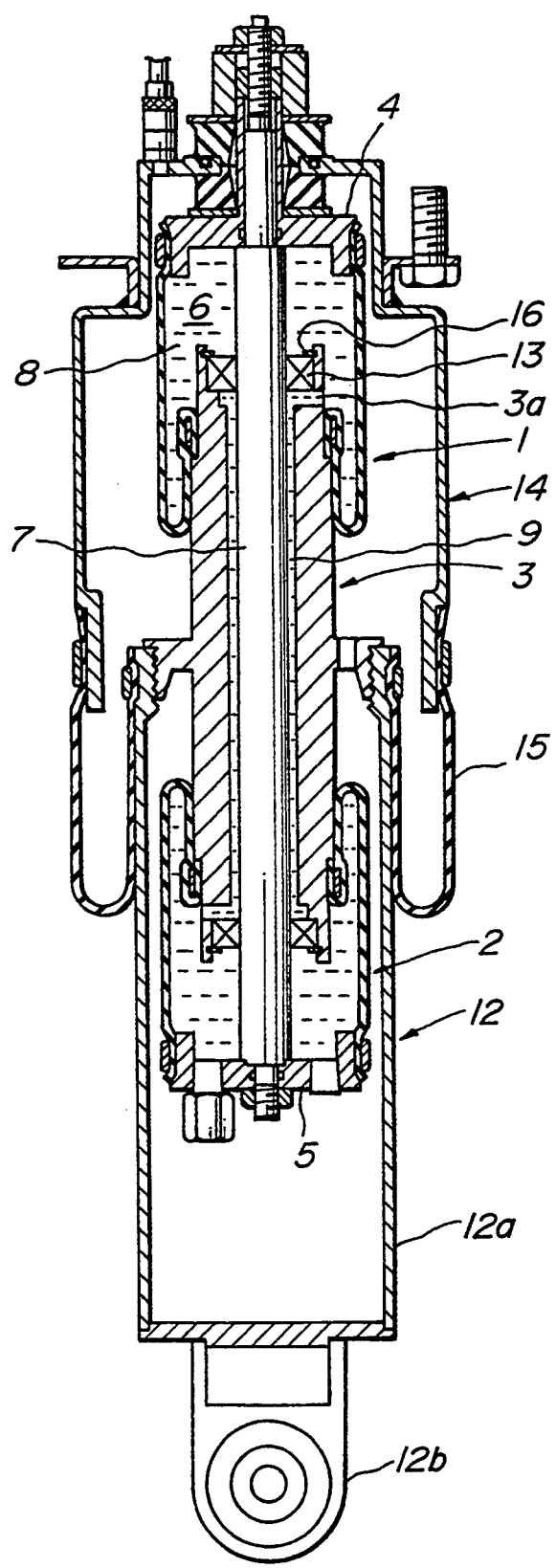

FIG_4a
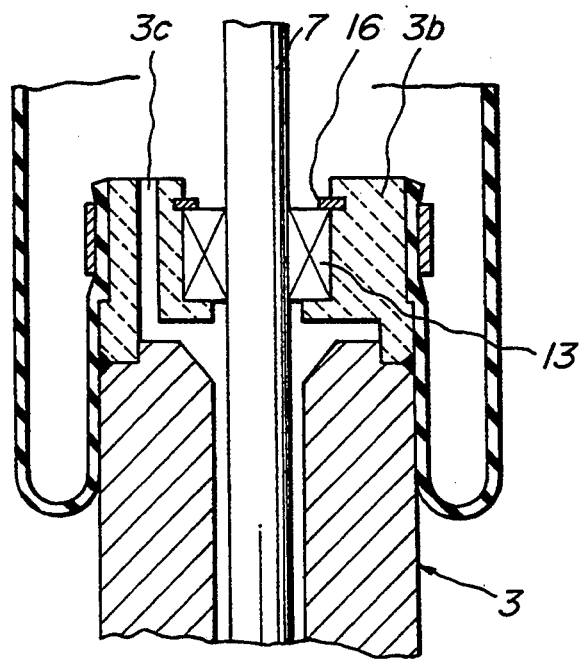
FIG_4b
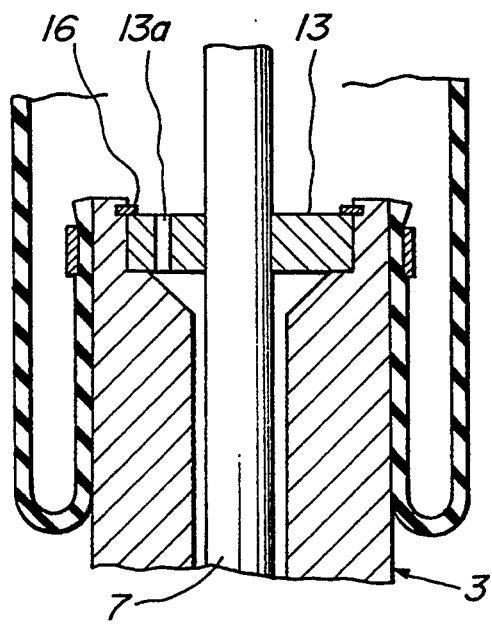

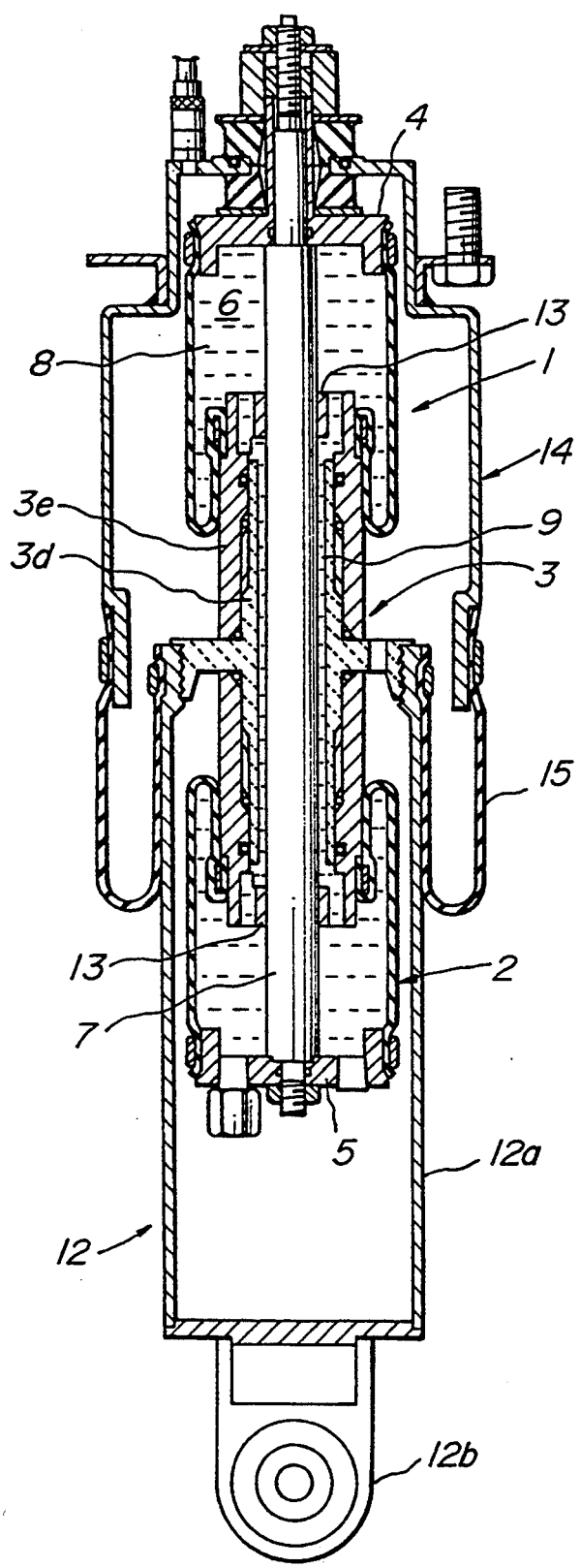
FIG_5

FIG_9a
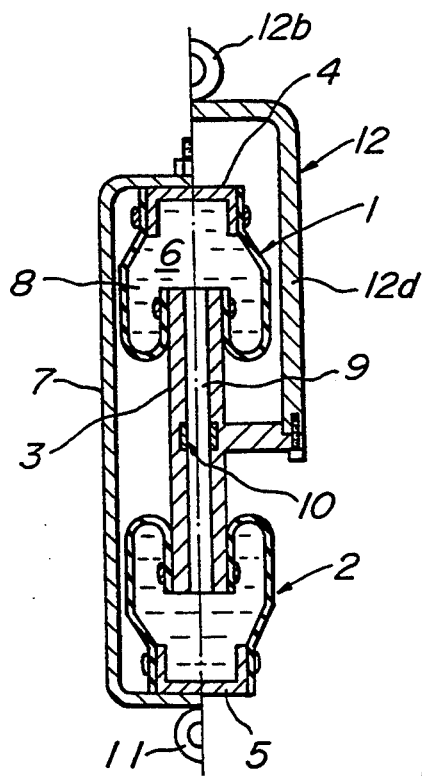
FIG_9b
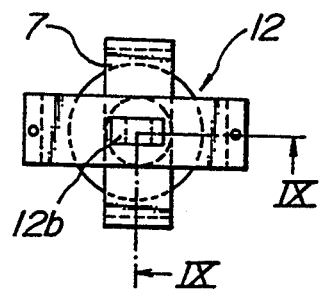
FIG_10
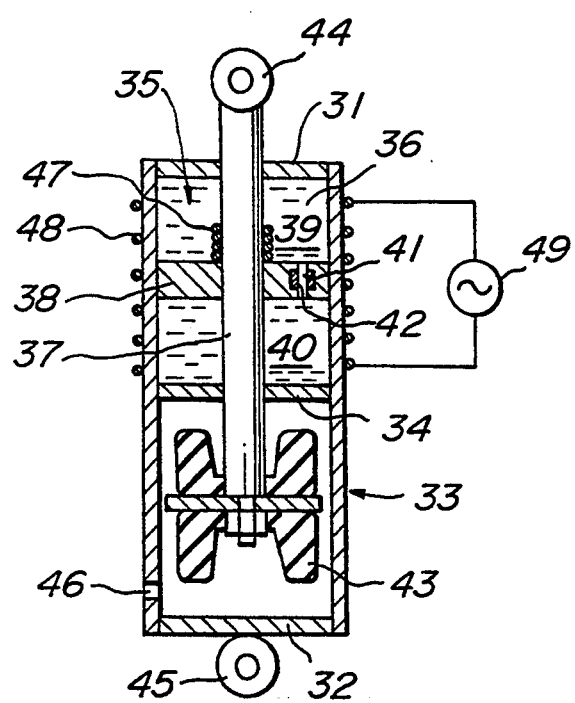

VIBRATION DAMPING DEVICE

This is a continuation of application Ser. No. 08/029,944 filed on Mar. 9, 1993, which is a continuation of Ser. No. 07/570,659 filed Aug. 21, 1990, both of which are now abandoned.

BACKGROUND OF THE INVENTION

1. Field of the Invention

This invention relates to a vibration damping device which can develop a large vibration damping performance when being applied to a suspension member for automobiles and the like.

2. Related Art Statement

In general, a shock absorber of monotube type or twin tube type is widely known as a conventional device developing the vibration damping performance when being applied to the suspension member for an automobile.

Such a shock absorber is constructed by enclosing an incompressible oil and a high pressure gas in an inside of a cylindrical body structure comprising a piston and a cylinder. The damping of vibrations through this shock absorber is attained by flowing the oil through a communicating hole formed in the piston based on relative motion between piston and cylinder.

However, the high pressure gas (15–30 kg/cm$^2$) acting to guarantee the approaching of piston rod is filled in the inside of the cylindrical body through a free piston as a partition in addition to the oil, so that it is required to considerably make the friction force of the free piston large for the filling of the high pressure gas and consequently the smooth action of the free piston under an influence of small external force can not be ensured. Therefore, such a shock absorber has a problem that high frequency slight vibration can not be absorbed effectively.

In the shock absorber, the free piston slidingly comes into contact with the cylinder under an influence of a large friction force and also the piston rod slidingly comes into contact with the end face of the cylinder under an influence of a large friction force for the complete filling of oil, so that when force transmitted to the absorber does not exceed these friction forces, the vibration damping performance can not effectively be developed.

SUMMARY OF THE INVENTION

It is, therefore, an object of the invention to advantageously solve the aforementioned problems of the conventional technique and to provide a vibration damping device which can very effectively absorb high frequency slight vibrations and sufficiently develop vibration damping performance even when the vibration input transmitted is small.

According to a first aspect of the invention, there is the provision of a vibration damping device comprising two cylindrical and flexible membrane members, an end portion of each of which membrane members being connected to respective end portion of a member constituting a restricted passage and another end portion of each of which membrane members being connected to each of respective face plates so as to form a closed chamber in such a manner that folded portions of both cylindrical and flexible membrane members face to each other, a rigid member connecting both the face plates to each other at inside or outside of the closed chamber, a fluid filled in the closed chamber, and a fastening member disposed at each side of the restricted passage constituting member and the face plate.

In a preferred embodiment of the first invention, the rigid member connecting both the face plates to each other is disposed in the closed chamber to pass through the restricted passage constituting member and a slide guide for guiding the sliding of the rigid member in the axial direction thereof is arranged in the restricted passage constituting member.

According to a second aspect of the invention, there is the provision of a vibration damping device comprising two cylindrical and flexible membrane members, an end portion of each of which membrane members being liquid-tightly connected to a respective end portion of a member constituting a restricted passage and another end portion of each of which membrane members being liquid-tightly connected to each of respective face plates so as to form a closed chamber, a rigid member connecting both the face plates to each other at inside or outside of the closed chamber, an electrorheological fluid filled in the closed chamber, electrodes arranged on the restricted passage constituting member in the closed chamber and contacting with the electrorheological fluid, and a fastening member disposed at each side of the restricted passage constituting member and the face plate.

According to a third aspect of the invention, there is the provision of a vibration damping device comprising a cylinder provided at each end with a end plate, an intermediate plate disposed in the cylinder to define a closed chamber with one of the end plates, an electrorheological fluid filled in the closed chamber, a piston united with a rod passing through the closed chamber and dividing the closed chamber into two chambers, at least one restricted passage communicating these divided chambers with each other, electrodes disposed on the restricted passage and contacting with the electrorheological fluid, an elastic stopper attached to an end portion of the rod outside the closed chamber in the cylinder and impinging with the other end plate or the intermediate plate, and a fastening member disposed at each of cylinder side and rod side.

BRIEF DESCRIPTION OF THE DRAWINGS

The invention will be described with reference to the accompanying drawings, wherein:

FIGS. 1, 2, 3, 4a, 4b and 5 are schematically sectional views of various embodiments of the vibration damping device according to the first invention, respectively;

FIGS. 8a, 8b, 9a and 9b are schematic views of modified embodiments of the vibration damping device according to the second invention; and FIG. 10 is a schematically sectional view of an embodiment of the vibration damping device according to the third invention.

DESCRIPTION OF THE PREFERRED EMBODIMENTS

Figure 1:
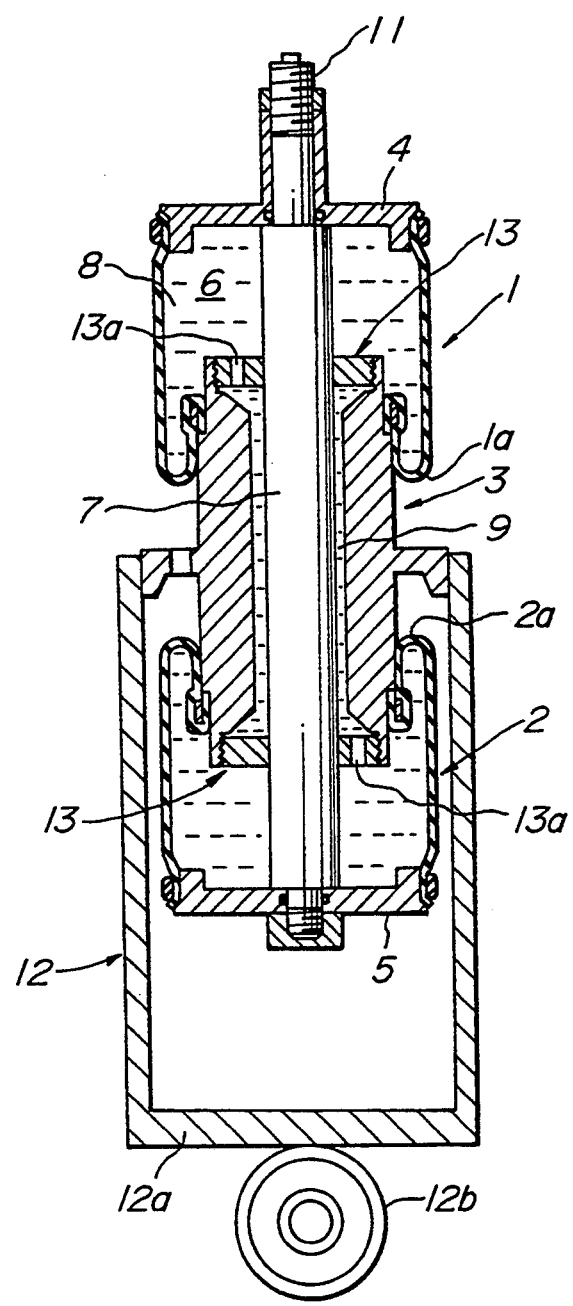

In the vibration damping device according to the invention, when vibrations are transmitted to the face plate at a mounted state to a vehicle or the like, if they are high frequency slight vibrations, the slight volume change inside each of the cylindrical and flexible membrane members can sufficiently be absorbed under small deformation resistance based on the deformation, particularly elastic deformation inherent to the cylindrical and flexible membrane member, so that this device can very effectively isolate high frequency slight vibrations to the members located at the side of the restriction passage.

Further, when the transmitted vibration has a relatively large amplitude, even if the rigid member connecting both the face plates to each other is arranged outside or inside the closed chamber, the rigid member can effectively be displaced even to a relatively small external force under an influence of a sufficiently small displacement resistance. By such displacement of the rigid member, the inner pressure in one of the flexible membrane members is reduced, while the inner pressure in the other flexible membrane member is increased by a quantity corresponding to the reduced quantity in the first flexible membrane member. As a result, water, air, anti-freeze, electrorheological fluid, magnetic fluid or the like as a filled fluid flows through the restricted passage constituting member, particularly restricted passage formed therein from high pressure side to low pressure side, so that remarkable vibration damping is always obtained irrespective of the magnitude of vibration force.

Since the folded portions of the cylindrical and flexible membrane members are arranged to face to each other, the acceptable relative displacement quantity between the restricted passage constituting member and the rigid member is sufficiently made large and the length of the restricted passage can be made long as compared with the case that these folded portions are located so as to separate apart from each other (e.g. the structure disclosed in Japanese Patent laid open No. 60-81529). The development of excellent vibration damping performance can be ensured.

When the electrorheological fluid is used as a working fluid and electrodes contacting with the electrorheological fluid are disposed on the restricted passage constituting member, the viscosity of the electrorheological fluid and hence the flowing resistance through the restricted passage can be varied in accordance with the voltage applied to the electrode. Thus, the vibration damping force can properly be changed in accordance with the frequency and amplitude of the transmitted vibration by adjusting the applied voltage.

According to the invention, therefore, it is unnecessary to house mechanical actuating mechanisms in the piston and piston rod as in the conventional shock absorber giving variable damping force, so that the structure of the device can considerably be simplified and the miniaturization of the device and the reduction of the cost can be realized.

This is true when the magnetic fluid is used as a working fluid and coils are arranged around the restricted passage constituting member. In this case, the required vibration damping force can be obtained by adjusting at least one of coil voltage and current.

When the liquid is filled in the closed chamber, it is necessary that the ratio of volume change against the displacement is made equal in the upper a flower closed chambers by using the same cylindrical and flexible membrane members.

In the above structure, for example, the quantity of volume change in the upper closed chamber is absorbed by the lower closed chamber through the restricted passage. If the ratio of volume change in the upper closed chamber is larger than that of the lower closed chamber, however, since the filled liquid is incompressible, the volume difference between the upper and lower closed chambers forcedly expands the upper cylindrical and flexible membrane member to increase the spring constant. Consequently, vibrations are apt to be easily transmitted and in the worst case the cylindrical and flexible membrane member is punctured.

Moreover, when gas is used as a fluid, it is preferable to use the same cylindrical and flexible membrane member. Since the gas is compressive, it is acceptable that the upper and lower closed chambers exhibit a somewhat different ratio of volume change against the displacement. For example, when the effective diameter of either one of the cylindrical and flexible membrane members is larger than that of the other member, the pressure receiving area against air pressure is different between both the members, so that the device can bear a load corresponding to product of pressure receiving are difference to air pressure and develop functions of air spring and shock absorber.

When vibrations are transmitted to the side of the restricted passage constituting member, the same action of the above vibration damping device as in the case of transmitting vibrations to the side of the face plate is developed.

In the above device, when the rigid member connecting the face plates to each other is arranged so as to pass through the restricted passage constituting member in the closed member and a sliding guide is disposed in the restricted passage constituting member, the sufficient rigidity can be developed against an external force in a direction crossing to the axial line of the restricted passage constituting member, and also the premature breakage of the folded portion in the flexible membrane member due to the extremely small curvature of radius can effectively be prevented.

In this case, the sliding guide arranged inside the closed chamber is not required to seal the filled fluid, so that the sliding resistance of the rigid member against the sliding member can be made sufficiently small, and consequently the vibration damping performance can effectively be developed even against relatively small force.

In the vibration damping device according to the invention, high frequency slight vibrations can effectively be absorbed by the deformation of the cylindrical and flexible membrane member, and also vibrations having a small vibration exciting force can sufficiently be damped under small displacement resistance of the rigid member connecting the face plates to each other.

Furthermore, the vibration damping performance can be developed based on the flowing of the electrorheological fluid as a filled fluid through the restricted passage constituting member. In this case, the vibration damping force can be changed very simply and rapidly to a given value by adjusting the voltage applied to the electrode. Even in this device, therefore, it is unnecessary to house mechanical actuating mechanisms such as motor, slide plate and the like in the piston rod and piston as in the conventional shock absorber giving variable damping force, so that the structure of the device can be simplified and also the miniaturization of the device and the reduction of the cost can be realized.

In the device according to the invention, for example, when vibrations are transmitted to the side of the rod, the pressure in one of the chambers divided by the piston united with the rod is reduced, while the pressure in the other chamber is increased by a quantity corresponding to the reduction of pressure in the first chamber, whereby the electrorheological fluid flows from the pressure applied side to the pressure reduced side through the restricted passage, and consequently vibrations are damped.

In this device, the increase of vibration damping force is also carried out by applying voltage to the electrode disposed in the restricted passage.

Moreover, the extra displacement of the rod against the cylinder in this device is elastically obstructed by the contacting of the elastic stopper attached to the end portion of the rod with the end face of the cylinder or the intermediate member in the cylinder.

According to the vibration damping devices of the invention, high frequency slight vibrations can sufficiently be absorbed, and also vibrations having a small vibration exciting force can effectively be damped. Furthermore, when the electrorheological fluid is used as a working fluid, the given vibration damping force can surely be obtained by adjusting the voltage applied to the electrode. Moreover, the device can be simplified and miniaturized and the cost can be reduced.

FIG. 1 is a longitudinal section view of an embodiment of the vibration damping device according to the first invention, wherein numerals 1 and 2 are cylindrical and flexible membrane members, respectively.

An end portion of each of these cylindrical and flexible membrane members 1 and 2 is airtightly or liquid-tightly connected to respective end portion of a restricted passage constituting member 3 being substantially cylindrical as a whole. The other end portions of these membrane members 1 and 2 are airtightly or liquid-tightly connected to respective face plates 4 and 5, respectively, whereby a closed chamber 6 is formed in such a manner that folded portions 1a and 2a of the membrane members 1 and 2 face each other. The face plates 4 and 5 are connected to each other through a rigid member 7 inside the closed chamber 6.

The closed chamber 6 is filled with a fluid 8 such as air, other gas, water, anti-freeze, electrorheological fluid, magnetic fluid and other liquid. The fluid 8 is filled in the inside of each of these membrane members 1 and 2 and a restricted passage 9 of a given diameter formed substantially over a full length of the restricted passage constituting member 3. Furthermore, fastening members 11, and 12 are arranged onto the face plate 4 and the restricted passage constituting member 3, respectively.

The fastening member 11 disposed on the face plate 4 is integrally united with the rigid member 7 and has a male screw shape, which can be connected, for example, to a body frame of a vehicle through a rubber bush. On the other hand, the fastening member 12 disposed on the restricted passage constituting member 3 comprises a cup-like member 12a fixed to an outward flange of the restricted passage constituting member 3 and an eye hook 12b disposed on the outer bottom face of the cup-like member 12a, which can be connected, for example, to a lower arm of the vehicle through the eye hook 12b.

When an electrorheological fluid is used as the fluid 8 filled in the closed chamber 6, electrodes contacting with the fluid are disposed on the peripheral wall of the restricted passage 9 to adjust the voltage applied to the electrode. When a magnetic fluid is used as the filled fluid 8, a coil is arranged around the restricted passage constituting member 3 made from an electrically conductive material to adjust at least one of current and voltage supplied to the coil, whereby the fluid viscosity and hence vibration damping force can be changed, if necessary.

In the vibration damping device of the above structure, a sliding guide 13 for guiding the rigid member 7 in the axial direction inside the restricted passage constituting member 3 is preferably arranged in the restricted passage constituting member 3, particularly the upper and lower end portions thereof in the illustrated embodiment. Moreover, each of these sliding members 13 has a through-hole 13a having a transverse section area larger than the effective transverse section area of the restricted passage 9.

According to the above vibration damping device, when high frequency slight vibrations are input to the side of the face plate or the restricted passage constituting member, the cylindrical and flexible membrane members 1 and 2 are deformed to absorb the volume change inside the membrane members, whereby the transmission of high frequency slight vibrations to the other side can effectively be prevented.

Furthermore, the sliding guide 13 arranged inside the closed chamber makes the sliding of the rigid member 7 smooth and sufficiently acts to effectively support external force in a direction crossing with the axial line of the rigid member 7 and is unnecessary to consider the sealability on the filled fluid 8. Hence, the friction force of the rigid member 7 to the sliding guide 13 can be made sufficiently small, and consequently the rigid member 7 can effectively be displaced even against a small external force to develop excellent vibration damping performance based on the flowing of the filled fluid 8 through the restricted passage 9.

In the above device, the folded portions 1a and 2a of the cylindrical and flexible membrane members 1 and 2 are located to face to each other, so that the acceptable quantity of relative displacement between the restricted passage constituting member 3 and the rigid member 7 can be assured to a large extent and also the length of the restricted passage can sufficiently be prolonged, whereby the vibration damping performance can largely be improved.

Of course, the slide mechanism composed of the rigid member 7 and the sliding guide 13 is made from a material having a low friction force and high mechanical strength and wear resistance. In case of using the electrorheological fluid as the filled fluid 8, it is preferable that the sliding guide 13 is made from a material having an insulating property in connection with the material of the restricted passage constituting member 3 for preventing the occurrence of abnormal discharge between anode and cathode, or the sliding guide 13 is insulative to the restricted passage constituting member 3.

Figure 2:
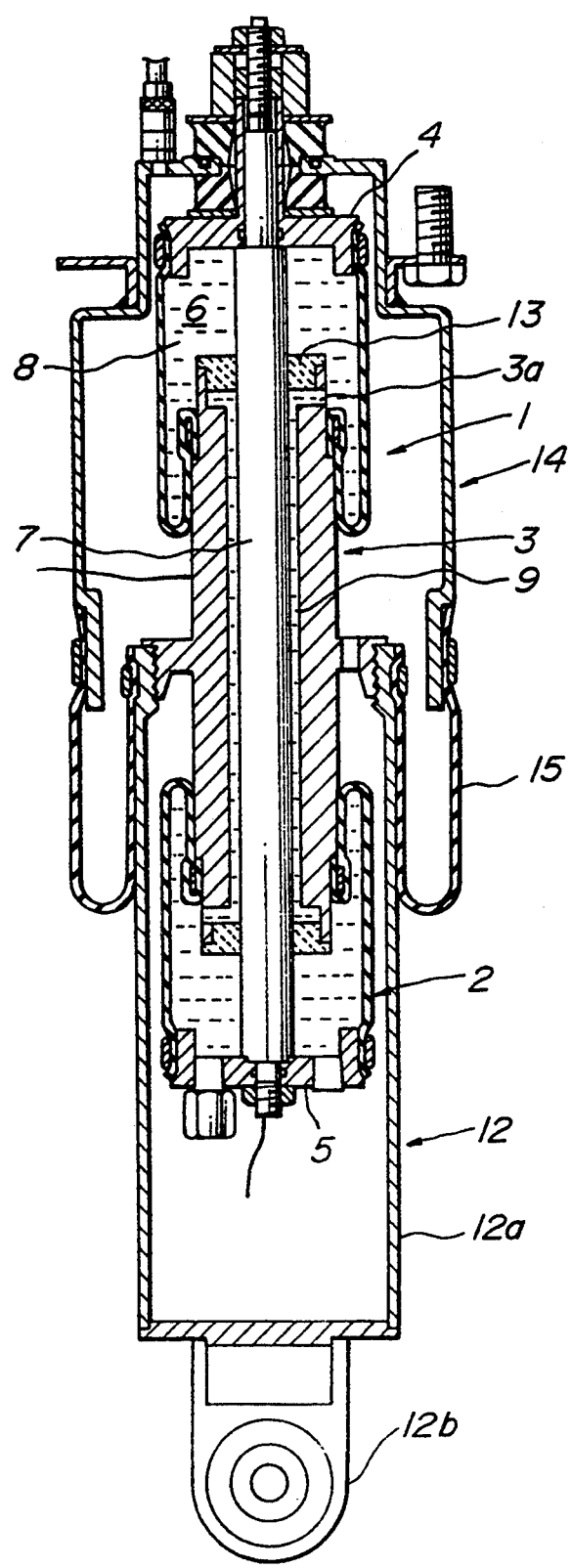

FIG. 2 is a longitudinally sectional view of another embodiment comprising a combination of substantially the same device as in FIG. 1 and an air spring. In this case, an outer sleeve 14 is attached to the side of the face plate 4, while the cup-like member 12a attached to the restricted passage constituting member 3 serves as an inner sleeve and is airtightly connected to the outer sleeve 14 through a flexible sleeve 15. Also plural through-holes communicating the inside of the outer sleeve with the inside of the inner sleeve are formed in the outward flange of the restricted passage constituting member 3 to define an air spring. On the other hand, the sliding guide 13 in the vibration damping device is fixed to each of the upper and lower end portions of the restricted passage constituting member 3 by screwing together, and plural through-holes 3a directing in a direction perpendicular to the rigid plate 7 are formed in the restricted passage constituting member 3 at a position adjacent to the sliding guide 13.

According to such a combination, the device can be applied to a suspension for an automobile as it is. The same action and effect as in the aforementioned device can be achieved by such a vibration damping device.

FIG. 3 shows a modified embodiment of the device shown in FIG. 2, wherein the sliding guide 13 is constructed by a generally used slide bearing or roll bearing and is fixed to each end portion of the restricted passage constituting member 3 through a snap ring 16 so as not to come out from the restricted passage constituting member 3. FIG. 4 illustrate an embodiment in which the sliding guide 13 is fastened to the restricted passage constituting member 3 at a position corresponding to the fixing position of the cylindrical and flexible membrane member 1, 2 to the member 3 through clamping, whereby the stroke quantity of the face plate 4, 5 is made large.

In FIG. 4a, a support 3b for the sliding guide is jointed to a body portion of the restricted passage constituting member 3 by welding and the sliding guide 3 is attached to the support 3b for the sliding guide through the snap ring 16. Plural through-holes 3c are formed in the support 3b to extend in the axial direction of the rigid member 7. In FIG. 4b, the sliding guide 13 is attached to an inside of an enlarged portion formed in the end portion of the restricted passage constituting member 3 through the snap ring 16.

In an embodiment of FIG. 5, the restricted passage constituting member 3 is constituted by inner and outer double cylindrical members 3d and 3e fixed to each other, wherein the restricted passage 9 is formed by the inner cylindrical member 3d and fastened at its outward flange to the cup-like member 12a. Each of the cylindrical and flexible membrane members 1 and 2 is connected to the respective end portion of the outer cylindrical member 3e.

Even in these embodiments, the sliding member 13 guides the sliding motion of the rigid member 7 under a low friction force like the embodiment of FIG. 1 and simultaneously gives a sufficient rigidity to the device against external force in a direction crossing with the axial line of the rigid member 7. It further acts to effectively prevent the premature breakage of the folded portions 1a, 2a in the cylindrical and flexible membrane members 1, 2 due to the extremely small curvature of radius.

Figure 6:
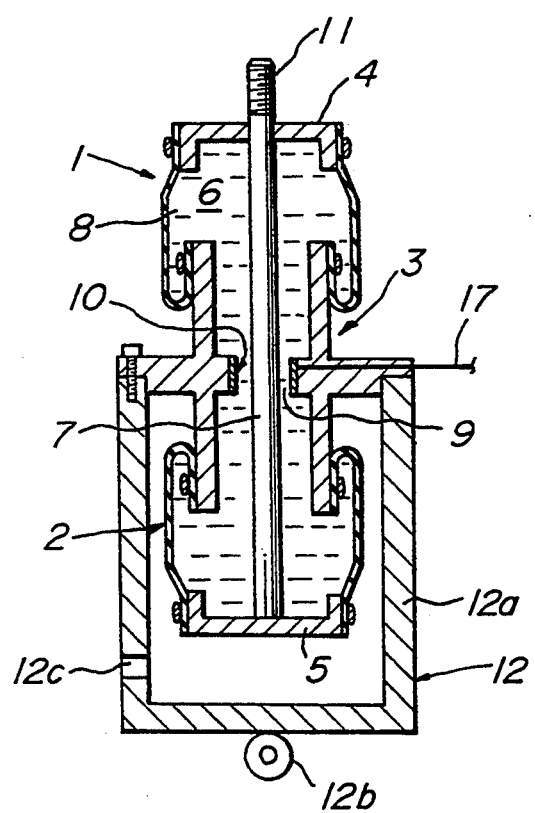
FIG. 6 is a schematically sectional view of an embodiment of the vibration damping device according to the second invention.

FIG. 6 is a longitudinal section view of an embodiment of the vibration damping device according to the second invention, in which the same parts as in FIGS. 1 to 5 are represented by the same numerals.

Each end portion of the cylindrical and flexible membrane members 1, 2 is liquid-tightly connected to the respective end portion of the restricted passage constituting member 3 being substantially cylindrical as a whole. The other end portion of each of the members 1, 2 is liquid-tightly connected to each of respective face plates 4, 5 to form a closed chamber 6. The face plates 4, 5 are connected to each other through the rigid member 7 inside the closed chamber 6. An electrorheological fluid is used as a fluid 8 filled in the closed chamber 6, while electrodes 10 contacting with the electrorheological fluid are arranged on the restricted passage constituting member 3. Hence, the peripheral wall of the restricted passage 9 formed in the central portion of the member 3 in the lengthwise direction thereof inside the closed chamber 6. Furthermore, the fastening members 11, 12 are attached to the face plate 4 and the restricted passage constituting member 3, respectively, in the same manner as in the aforementioned embodiment.

Of course, such a vibration damping device can effectively absorb high frequency slight vibrations under the deformation of the cylindrical and flexible membrane members 1, 2 and effectively damp large amplitude vibrations under small displacement resistance of the rigid member 7.

In case of applying this device to a given location, when vibrations are transmitted to either one of the face plate and the restricted passage constituting member, for example, the face plate, the internal pressure in one of the flexible membrane members increases and the internal pressure in the other flexible membrane member decreases by an quantity corresponding to the increment of the internal pressure under an action of the rod-like rigid member 7. As a result the electrorheological fluid is flown from the high pressure side to the low pressure side through the restricted passage 9 and consequently the vibration damping force is produced in accordance with the flowing resistance of the electrorheological fluid through the restricted passage 9.

In the development of such a damping performance, when the cup-like member 12a of this device is provided with a hole 12c as shown in FIG. 6, air passes through the hole 12c in accordance with the increase or decrease of volume change in the cylindrical and flexible membrane member 2, so that the internal pressure in the cup-like member 12a does not affect the vibration damping performance.

If it is intended to enhance the vibration damping performance in accordance with vibration frequency, vibration amplitude or the like, one of the electrode is connected to earth and a voltage is applied to the remaining electrode 10 connected to a direct current source through a lead wire 17. As a result the viscosity of the electrorheological fluid is increased in accordance with the applied voltage, and consequently the flowing resistance of the electrorheological fluid and hence the increase of the vibration damping force is attained.

In the illustrated embodiment, an alternating current source may be used instead of the direct current source. In this case, the increase of the vibration damping force can be attained.

Figure 7A:
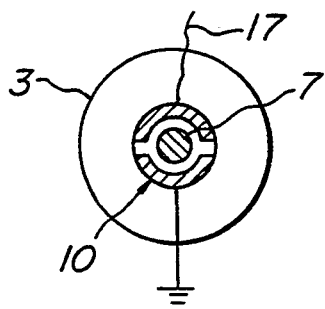
FIGS. 7a, 7b, 7c, 7d and 7e are transversely sectional views of various embodiments of electrode arrangement.
Figure 7B:
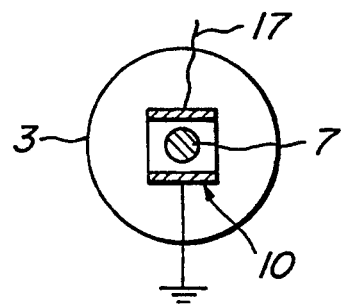

FIGS. 7a to 7e shows various electrode arrangements. FIGS. 7a and 7b are the same case as in FIG. 6, wherein one of the electrodes is connected to earth and the remaining other electrode is connected to the direct current source through the lead wire 17.

According to these embodiments, the electrode arrangement can be simplified. Particularly, the electrode may be constructed by cutting a plate material in the embodiment of FIG. 7b.

Figure 7C:
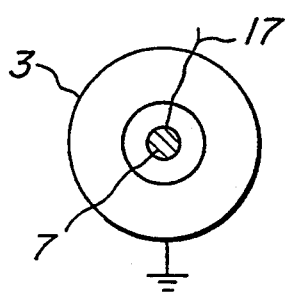

In FIG. 7c, the rigid member 7 is connected to the direct current source through the lead wire 17, while the restricted passage constituting member 3 is connected to earth through the fastening member 12. According to this embodiment, the voltage may be applied to the electrorheological fluid without arranging special electrodes.

Figure 7D:
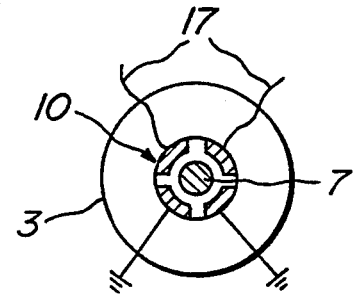
Figure 7E:
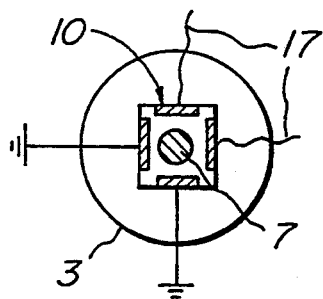

In FIGS. 7d and 7e, two pairs of electrode plates opposing each other are disposed on the peripheral wall of the restricted passage to constitute the electrode 10. Two electrode plates are connected to the direct current source through separate lead wires 17 and the remaining two electrode plates are connected to earth.

According to the later embodiments, the vibration damping force can be adjusted at plural stages by independently applying the voltage to each pair of the electrode plates without changing the applied voltage. This adjusting stage may be increased by arranging three pairs or more of the electrode plates, if necessary.

Figure 8A:
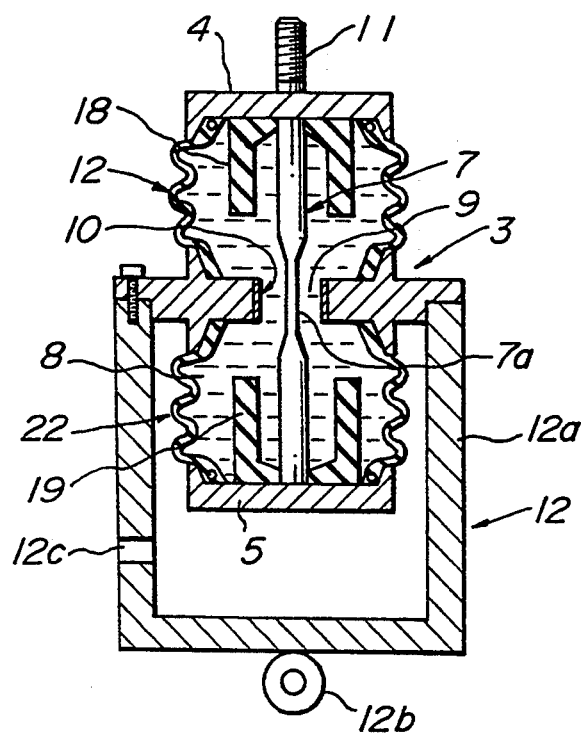
Figure 8B:
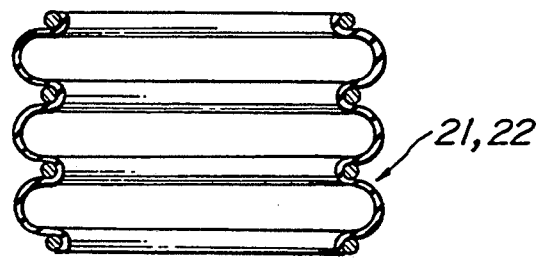

FIG. 8a shows a modified embodiment of the device shown in FIG. 6, in which the convolute-type cylindrical and flexible membrane members 21, 22 as shown in FIG. 8b are used instead of the cylindrical and flexible membrane members 1, 2 shown in the aforementioned embodiment. Elastic stoppers 18, 19 contacting with inward flange of the restricted passage constituting member 3 are disposed on the inside surfaces of the face plates 4, 5 around the rigid member 7. Further a necked portion 7a is formed in the central portion of the rod-like rigid member 7 in its lengthwise direction. According to this embodiment, not only the same action and effect as in the aforementioned embodiments can be attained but also the amount of the expensive electrorheological fluid used may be reduced by arranging the elastic stoppers 18, 19 in the closed chamber 6. Furthermore, the sectional area of the restricted passage can be changed in accordance with the relative position between the restricted passage constituting member 3 and the face plate 4, 5 because of the presence of the necked portion 7a in the rigid member 7. Moreover, when the rigid member itself is utilized as a part of the electrode, the potential between the electrodes can be changed under the action of the same voltage. Thus, the vibration damping force can be adjusted to a given value.

In the embodiment of FIG. 9, the restricted passage constituting member 3 is comprised of a cylindrical member having a uniform inner diameter over its full length, and the face plates 4, 5 are connected to each other through the rigid member 7 extending outside the closed chamber 6. This rigid member 7 has a rectangular frame shape as a whole and the fastening member 11 attached thereto is an eye hook.

The fastening member 12 of this embodiment is fixed to a protruding arm of the restricted passage constituting member 3 arranged at a position opposing the radial direction of the member 3, and is comprised of a frame 12d being substantially inverted U-shape as a whole and an eye hook 12b attached to the frame 12d.

According to the device of this embodiment, the full length of the restricted passage 9 is made long, whereby a large vibration damping force can be produced.

FIG. 10 is a longitudinally sectional view of an embodiment of the vibration damping device according to the third embodiment.

In this embodiment, an intermediate wall 34 is disposed in a cylinder 33 having end walls 31 and 32 to form a closed chamber 35, and an electrorheological fluid as a working fluid 36 is filled in the closed chamber 35. Furthermore, the closed chamber 35 is divided into two chambers 39 and 40 by a piston 38 integrally united with a rod 37 passing through the closed chamber 35, wherein the rod 37 is slidable to the end wall 31 and the intermediate wall 34 and the piston 38 is slidable to the cylinder 33. Moreover, at least one restricted passage 41 is formed in the piston 38 so as to communicate both the divided chambers 39, 40 with each other, and electrodes 42 contacting with the electrorheological fluid are arranged on the peripheral wall of the restricted passage 41.

On the other hand, one end portion of the rod 37 protruding from the closed chamber 35 and located between the end wall 32 and the intermediate wall 34 is provided with an elastic stopper 43 contacting with these walls 32, 34, while fastening members 44, 45 each comprised of an eye hook are attached to the other end portion of the rod 37 and a lower end portion of the cylinder 33, respectively.

Preferably, a hole 46 is formed in the cylinder 32 between the end wall 32 and the intermediate wall 34 as shown in FIG. 10.

The electrodes 42 can be connected to the direct current or alternating current source in any one of the aforementioned methods. In this embodiment, the electrodes 42 are connected to both ends of wire 47 tightly wound around the rod 37, while a wire 48 roughly wound around the cylinder 33 is connected to an alternating current source 49. Thus, high voltage can be generated in the wire 47 at the rod side by electromagnetic induction. Consequently it is unnecessary to draw out the lead wire (not shown) connected to the electrodes 42 toward the outside of the device.

In the illustrated device, when vibrations are transmitted to the rod or cylinder side, the pressure in one of the divided chambers 39, 40 is reduced and the pressure in the other chamber is increased. As a result the electrorheological fluid 36 flows from the high pressure side to the low pressure side to generate the vibration damping force.

The increase of the vibration damping force generates an induced electromotive force in the wire 47 at the rod side to enhance the viscosity of the electrorheological fluid 36 passing through the restricted passage 41.

In addition, extra relative displacement between the rod 37 and the cylinder 33 is surely obstructed by elastically contacting the elastic stopper 43 with the intermediate wall 34 or the end wall 32.

As mentioned above, according to the invention, not only high frequency slight vibrations can effectively be absorbed, but also vibrations can sufficiently be damped irrespective of the magnitude of vibration exciting force. Furthermore, the vibration damping force can always stably be developed and the may be changed, if necessary. Moreover, the structure of the device is simple and may be miniaturized as a suspension device and also the cost can sufficiently be reduced.

What is claimed is:

1. A vibration damping device comprising; two cylindrical rolling lobe type flexible membrane members each having an inwardly folded portion, two face plates each connected at an end to an end portion of each of the membrane members, a restricted passage constituting member connected at each end portion thereof to an opposite end portion of each of the membrane members to form a closed chamber in such a manner that the folded portions of both membrane members face each other for rolling movement on said restricted passage constituting member, a rigid member passing through the restricted passage constituting member and connecting both the face plates to each other and disposed inside the closed chamber, an electrorheological fluid filled in the closed chamber, electrodes arranged on the restricted passage constituting member in the closed chamber and contacting with the electrorheological fluid, and two fastening members disposed on sides of the restricted passage constituting member and the face plates.

2. The vibration damping device according to claim 1, wherein said device further comprises an air spring arranged therearound and airtightly defined by an outer sleeve and a flexible sleeve.

3. The vibration damping device according to claim 1, wherein a slide guide for guiding the sliding of the rigid member in the axial direction thereof is arranged in the restricted passage constituting member.

* * * * *